Patented May 13, 1947

2,420,310

UNITED STATES PATENT OFFICE 2,420,310

CASING OR PACKAGING PERISHABLE FOOD PRODUCTS

Leo A. Goodman, Brooklyn, N. Y., assignor of one-half to Marcleph & Co. Inc., Brooklyn, N. Y., a corporation of New York No Drawing. Application April 9, 1941, Serial No. 387,713

3 Claims. (Cl. 99—171)

This invention relates to the art of casing or packaging perishable food products such for example as sausage, meat, fowl, seafood, and dairy products, to preserve the content and keep it fresh.

It is desirable that the casing or packaging should hug the surface of the food content uniformly. However, because the differences in contraction and expansion of the casing and its content, due principally to shrinkage of the content by evaporation of moisture, or other causes, the casings heretofore used generally developed objectionable wrinkles.

It is an object of this invention to case or pack food in a casing or packaging made of material that when heated at practical temperatures, that is, at or below 100° C., will contract to conform closely to the content, and thus avoid wrinkling.

I have found that certain materials of the general class known to rubber chemists as "elastomers," which class includes synthetic rubber or rubber-like materials, have the property of considerable extension under the influence of a moderate amount of heat, then becoming set when cooled in substantially their stretched condition, and are capable of contracting to their original dimensions when subsequently reheated at or above the temperature at which the extension took place.

The fact that such extended material will contract or shrink when subjected to heat makes it particularly suitable for casing or packaging food products since by such heat treatment the covering material will hug tightly against the content of the casing or package, and will on cooling become set in that state. The material set in its stretched or extended condition will hereinafter be referred to as "set-stretched" material.

Of the general class of elastomers best suited for carrying out the invention are stabilized hydrohalogen butadiene derivatives, as well as certain materials sometimes referred to as "elastoplastics." In the first class may be mentioned films of stabilized rubber hydrochloride, known under the tradename of "Pliofilm," and stabilized assymmetrical amorphous rubber hydrchloride. In the second class may be included such materials as plasticized polyvinyl chloride, plasticized "Formvar" (a copolymer of vinyl acetate and formaldehyde), or a mixture of plasticized polyvinyl chloride and plasticized "Formvar." It is to be understood, however, that the invention is not limited to the use of these particular materials since any suitable material of the general class of elastomers that has the property of returning to its orginal or substantially original dimensions by heat treatment after having been initially extended may be used.

In carrying out my invention, in its preferred form, I take a sheet of crystalline rubber hydrochloride stabilized with an inhibitor such as hexamethylene tetramine to retard photochemical disintegration, with or without plasticizers, of a gauge varying from .001" to .003", generally about .002", and form it by any known means into a casing or package of the desired form, which in the case of a sausage casing will be tubular.

The gauge should be such as to allow for the reduction in thickness of the material caused by the stretching without materially weakening its substance. While the stretching causes a considerable extension of the material in the direction in which the force is applied, such extension is not accompanied by a corresponding contraction in a direction crosswise to that of the applied force. For instance, I have found that where, as in the case of a sausage casing, the material is formed into a tube and increased in diameter by stretching it circumferentially, only a relatively small reduction in length occurs.

I then subject the formed casing or container to heat treatment of a temperature varying from 50° to 70° C. for several seconds, the temperature depending on the gauge of the film, the kind and amount of plasticizer present, and the nature and power of the stretching or racking device. The heating may be effected by immersing the casing or package in a bath of water, mineral oil, or other suitable medium, heated to the desired temperature, or by heating with hot air in a suitable chamber.

While the casing or container is heated, it is subjected to a stretching operation by the use of any suitable device to stretch it in a given direction to an extent such that when subsequently heated above the temperature at which it was stretched it will quickly return to its original area. I have found that stretching the material about 100% to 150% in a given direction will result in its complete retraction to its original area when heated above the temperature at which it was stretched, and that the higher the temperature, the faster and more complete is the retraction of the material to its original area.

Where the material is formed in a tube for use as a sausage casing, the stretching force is applied in the direction of the diameter of the tube so as to extend the tube circumferentially. For instance, a tube of four inch circumference may be stretched satisfactorily to about eight or ten inches in circumference. While I prefer first to form the material into a casing and then stretch it, it is to be understood that the material may be used in set-stretched sheet form and subsequently formed into the desired shape.

The stretched material upon cooling becomes set in its stretched or extended condition, and will maintain such condition for an indefinite period when kept at temperatures substantially below the temperatures at which it was stretched. The sausage meat or food content is enclosed in the casing or container formed of the set-stretched material, or in the case where the set-stretched material is used in sheet form, it is wrapped around the food product, and then the casing or package is heated to a temperature at or above that at which the stretching took place. This causes the material to contract and to hug the content uniformly, smoothly and tightly, thus avoiding the formation of wrinkles. The extent to which the material, in its use as a casing or packaging, is contracted is ordinarily very much less than that to which it was extended in the stretching operation, thus permitting of further contraction by subsequent heat treatment when required. The cased or packed food product is then cooled to room temperature, or lower if desired, to set the casing or packaging in its contracted condition.

I have found that a sheet of film of rubber hydrochloride stabilized with hexamethylene tetramine or other suitable stabilizer such as described in the Calvert Patents Nos. 1,989,632 and 2,139,647, with or without plasticizers, when formed into a tube and stretched as above described under a temperature of not more than 70° C., that is, below the plastic point of the material, provides an excellent and inexpensive casing or packaging. Such a casing may be used satisfactorily as a substitute for the unsanitary and more expensive hog-bung, particularly for liver sausage or liverwurst, as well as for other casing or packaging purposes. The material itself is non-porous, flexible, and highly resistant to tear. While the set-stretched material may be used satisfactorily for such purposes, attempts made to use the material in its original or unstretched condition have been unsuccessful because of the fact that due to shrinkage or falling in of the sausage, which usually occurs during the cooling process after cooking, the casing becomes loose and remains in a wrinkled condition.

A casing made of the set-stretched material will immediately tend to contract when immersed in water at a temperature at which the sausage is cooked and will continually conform with the surface of the sausage during the cooking process. Furthermore, any slight wrinkling which might occur when the sausage is quickly cooled after the cooking operation and which might be caused either by the falling in of the sausage or by a slight extension of the casing, can immediately and permanently be removed by immersing the sausage in very hot water or by spraying the cooled sausage with boiling water for a few seconds. This will result in a further contraction of the casing material and will remove any wrinkles. The material of which the casing is made is unaffected by hot animal and vegetable fats and oils, and will permit cooking at temperatures as high as 100° C. Such a casing or packaging is sanitary, will not putresce, decompose or form moldy surfaces, and will preserve food contents for a very long period, particularly if the food is stored at low temperatures.

I have discovered that if a sheet or film of the normal stabilized rubber hydrochloride (Pliofilm) is heated in air or in a solution of water, glycerine, and hexamethylene tetramine at temperatures of from about 116° to 135° C., it becomes very soft, tacky, and highly elastic, and that it will retain these characteristics when cooled to room temperatures. A sheet so treated becomes thermally agitated. However, its subsequent physical behavior will vary somewhat depending on whether or not the sheet contains plasticizers. I have found that a thermally agitated unplasticized sheet sets slowly in air and remains somewhat elastic for long periods, as much as several months, at room temperatures. The plasticized sheet, on the other hand, becomes set at room temperatures in a very short time, but on immersing it in boiling water it quickly regains its elasticity for a short period.

I have also found that when a sheet or film of the normal stabilized crystalline rubber hydrochloride is heated in a mineral oil bath at temperatures of from about 120° to 145° C., preferably about 135° C., for a few seconds, it becomes thermally agitated, that is to say it becomes soft, flexible and elastic, but because of the presence of the mineral oil it will not become tacky. Such a sheet when allowed to remain in the air for a short period apparently becomes set and loses its elasticity, the time of setting depending on whether or not the material is plasticized. The plasticized material sets in about two hours while the unplasticized material usually takes about forty-eight hours. If, however, such a sheet, after it has been set, is immersed in water at temperatures varying from about 40° to 60° C., depending upon the gauge of the sheet, it may be stretched in the manner previously described. When the set-stretched sheet is immersed in water at temperatures of about 85° to 100° C., that is, at temperatures higher than that at which it was stretched, it immediately contracts to its original area and recovers its thermally agitated condition of extreme softness, flexibility, and high elasticity.

Sheets or films of the normal stabilized crystalline rubber hydrochloride prepared as described in either of the two preceding paragraphs may be used for making casings or packagings, particularly where a high degree of elasticity is desired and the sheet is to be attached to a stretchable or expansible fabric base. Since the material in its normal condition is substantially non-elastic, it will not remain attached to a stretchable fabric base when the coated fabric is stretched. However, if the material in its normal condition is attached to or coated on a stretchable fabric base, and then thermally agitated, it will because of its induced elasticity stretch with the fabric and not become detached. A stretchable fabric coated with, or having a sheet of thermally agitated material attached thereto, may be stretched to the extent of the stretch of the fabric and set in its extended condition. For use as a sausage casing I prefer to employ a base of knitted fabric or other fabric that will be stretchable or expansible circumferentially.

Such thermally agitated materials, whether plasticized or not, may be stored for long periods by placing them in a cold medium at or below 4° C., immediately after their heat treatment. At these low temperatures they apparently become set and lose their elasticity, but upon removal to room temperatures they promptly regain their thermally agitated characteristics of softness, flexibility, and high elasticity. Because of this property, such thermally agitated rubber hydrochloride material may be formed into casings or packagings which are particularly useful in connection with food products intended to be kept in cold storage or which are prepared by quick freezing methods.

The casing may be suitably reenforced to prevent it from stretching longitudinally, because of the weight of the content, when held at one end and immersed in or lifted out of boiling water.

Since the material is non-porous, where the casing is intended for use with smoked meat products, a multiplicity of minute perforations may be formed in the casing, either before or after it has been extended, to permit of circulation of the smoke.

While I have described the invention particularly with relation to its use as a casing for sausages, it may be used for packing other food products, as well as for other purposes.

What I claim is:

1. A method of packaging a food product, which comprises forming a tubular casing of stabilized rubber hydrochloride, heating the casing at a temperature of about 50° to 70° C. for several seconds, stretching the casing circumferentially while so heated to an extent of not more than about 150% of its original size, cooling the casing to set it in stretched condition enclosing the food within the casing, and then heating the set-stretched casing and its content at a temperature not less than that at which the casing material was originally stretched and not more than about 100° C. to contract the casing tightly against its content.

2. A method of packaging a food product, which comprises forming a tubular casing of stabilized crystalline rubber hydrochloride, heating the casing in mineral oil at about 135° C. for a few seconds, setting the casing at approximately room temperature, stretching the casing circumferentially under the influence of heat at a temperature of from about 40° to 65° C., enclosing the product in the casing while the latter is in stretched condition, and then heating to a temperature of from about 85° to 100° C. to contract the casing tightly against its content.

3. A method of packaging a food product which comprises forming a tubular casing from sheet material composed of rubber hydrochloride and hexamethylene tetramine with plasticizers, stretching the casing circumferentially in water at a temperature of about 40° to 65° C., setting the material by cooling it at room temperature for a short period, enclosing the product in the stretched casing, and contracting the casing tightly against its content by heating in water at a temperature of from about 85° to 100° C.

LEO A. GOODMAN.

REFERENCES CITED

The following references are of record in the file of this patent:

UNITED STATES PATENTS

| Number | Name | Date |
|---|---|---|
| 2,240,245 | De Poix | Apr. 29, 1941 |
| 2,239,780 | Fikentscher | Apr. 29, 1941 |
| 2,168,651 | McCoy | Aug. 8, 1939 |
| 2,169,250 | Izard | Aug. 15, 1939 |
| 2,172,426 | Weingand | Sept. 12, 1939 |
| 2,201,457 | Smith et al. | May 21, 1940 |
| 2,223,057 | Bosel et al. | Nov. 26, 1940 |
| 2,027,962 | Currie | Jan. 14, 1936 |
| 2,301,222 | Minich | Nov. 10, 1942 |

FOREIGN PATENTS

| Number | Country | Date |
|---|---|---|
| 471,638 | Great Britain | Sept. 8, 1937 |
| 497,788 | Great Britain | Dec. 28, 1938 |
| 522,460 | Great Britain | June 18, 1940 |
| 524,777 | Great Britain | 1939 |